(12) United States Patent
Hikosaka et al.

(10) Patent No.: US 6,685,573 B2
(45) Date of Patent: Feb. 3, 2004

(54) THREAD FORMING TAP

(75) Inventors: Kensuke Hikosaka, Shishiro (JP); Haruyasu Andoh, Shishiro (JP)

(73) Assignee: OSG Corporation, Aichi (JP)

( * ) Notice: Subject to any disclaimer, the term of this patent is extended or adjusted under 35 U.S.C. 154(b) by 0 days.

(21) Appl. No.: 10/192,608

(22) Filed: Jul. 10, 2002

(65) Prior Publication Data

US 2003/0078109 A1 Apr. 24, 2003

(30) Foreign Application Priority Data

Oct. 22, 2001 (JP) ........................................ 2001-324178

(51) Int. Cl.⁷ ............................................... B21J 13/02
(52) U.S. Cl. ........................ 470/204; 470/198; 408/222
(58) Field of Search ................................. 470/198, 204; 408/219, 220, 222

(56) References Cited

U.S. PATENT DOCUMENTS 3,656,197 A * 4/1972 Van Vleet ................... 470/204
3,775,792 A * 12/1973 Leonard ..................... 470/204
6,217,267 B1 * 4/2001 Sugano et al. .............. 408/222

FOREIGN PATENT DOCUMENTS

| JP | 58-186527 | * 10/1983 | ................. 470/198 |
| JP | 10-86019  | * 4/1998  | ................. 470/198 |

* cited by examiner

Primary Examiner—Ed Tolan
(74) Attorney, Agent, or Firm—Muramatsu & Associates

(57) ABSTRACT

A thread forming tap which is capable of reducing tapping torque as well as improving durability by avoiding an increase of an apparent area of margins of external thread that causes interference with a grinding stone. The thread forming tap has an external thread in a screw shape with alternately linked margins and reliefs for forming an internal thread by plastic deformation upon having the margins of the external thread bite into a surface of a prepared hole of a workpiece. A helix of the margins of the external thread is in a direction opposite to a direction of a helix of the external thread relative to an axis of the tap.

9 Claims, 7 Drawing Sheets

Fig. 5

|  | Tapping Torque | Thrust Load |
|---|---|---|
| Sample B | 1 | 1 |
| Sample A | 0.83 | 0.97 |

THREAD FORMING TAP

FIELD OF THE INVENTION

The present invention relates to a thread forming tap, and more particularly, to a thread forming tap which is capable of reducing tapping torque as well as improving durability by avoiding an increase of an apparent area of margins of external thread that causes interference with a grinding stone.

BACKGROUND OF THE INVENTION

Typically, a tap is used to form internal threads. Taps are mainly classified into two types, a cut thread tap for cutting the surface of a prepared hole (hole before threading), and a thread forming tap for performing plastic deformation on the surface of the hole before threading. The cut thread tap, however, requires an elimination process due to the chips generated by the tapping, and the finished surface comes out rough. On the other hand, in the thread forming tap, no chips are generated during the tapping process, and the finished surface of the internal thread comes out smooth as well as durable, resulting in a wide range of use.

A conventional thread forming tap is shown in FIGS. 6A and 6B. As shown in a front view of FIG. 6A, the tip of the conventional thread forming tap 100 is established with an external thread 101 for rolling internal threads. A taper shaped chamfer 101a and a full thread part 101b are established on the external thread 101, and ridges are formed along the helix with a predetermined lead angle. Further, as shown in FIG. 6B, the external thread 101 has a square shape in cross-section, where four radially projected margins 102 and four reliefs 103 linked to the respective margins 102 are alternately established on the external thread 101 in the direction of the screw thread, i.e., along the helix of the ridges. In the example of FIG. 6A, each margin 102 is aligned in parallel with an axis O of the thread forming tap 100.

When forming an internal thread, the chamfer 101a of the thread forming tap 100 is spirally advanced on the surface of the prepared hole on a workpiece. By this spiral movement, the margins 102 on the chamfer 101a bite into the prepared hole on the workpiece, allowing the plastic deformation (plastic flow) while proceeding on the surface of the hole, thereby creating the internal thread. This internal thread is then finished by the margins 102 on the full thread part 101b which helically advances as well.

In the conventional thread forming tap 100, however, as shown in FIG. 7, the ridges (crests and roots) on the external thread 101 are at a lead angle κ, unlike the margins 102 which are parallel with the axis O. Therefore, during the grinding process for producing the thread forming tap, in which a grinding stone having ridges on the outer surface thereof proceeds along the lead of the ridges to grind a screw thread onto the external thread 101, an interference is occurred by the grinding stone with the margins 102, resulting in the increase of an apparent width (area) of the margins 102. This increase in the apparent width (area) causes a rotational resistance during tapping, i.e., an increase in tapping torque, resulting in an increase in the rolling load which also causes breakage of the margins 102.

SUMMARY OF THE INVENTION

Therefore, the object of the present invention is to solve the above noted problems involved in the conventional technology by providing a thread forming tap with low tapping torque and high durability that is capable of preventing the increase of the apparent area of the margins caused by the interference with the grinding stone.

In order to achieve this object, the thread forming tap in the first aspect of the present invention comprises an external thread established with radially projecting margins and reliefs smaller in diameter than that of the margins. The margins and the reliefs are alternately linked to one another on the external thread in a screw thread shape. When forming internal threads, the margins on the external thread bite into the surface of a prepared hole of a workpiece, where plastic deformation is performed. The margins are aligned helically in a direction opposite to a direction of a helix of the external thread.

In the thread forming tap in the second aspect of the present invention, the external thread has a lead angle α. The margins on the external thread have a helix angle β, where the helix of the margins is in the opposite direction of the helix of the external thread. Further, the helix angle β of the margins is larger than 0° but smaller than 10° or 4α.

In the thread forming tap defined in the third aspect of the present invention, oil flutes established on the external thread are directed either in parallel with or diagonal to the axis of the external thread. The oil flutes are extended in a straight line over either a part of or the entire external thread.

In the thread forming tap in the fourth aspect of the present invention, the oil flutes established on the external thread is inclined in the same manner as the margins of the external thread. The oil flutes have a helix angle β, where the helix is in the opposite direction of the helix of the external thread. The oil flutes are extended over either a part of or the entire external thread.

BRIEF DESCRIPTION OF THE DRAWINGS

FIG. 5 is a diagram showing performance comparison between the present invention (sample A) and the conventional technology (sample B) in a table form.

FIG. 6A is a front view and FIG. 6B is a cross sectional view, respectively, of the conventional thread forming tap.

DETAILED DESCRIPTION OF THE INVENTION

Figure 1:
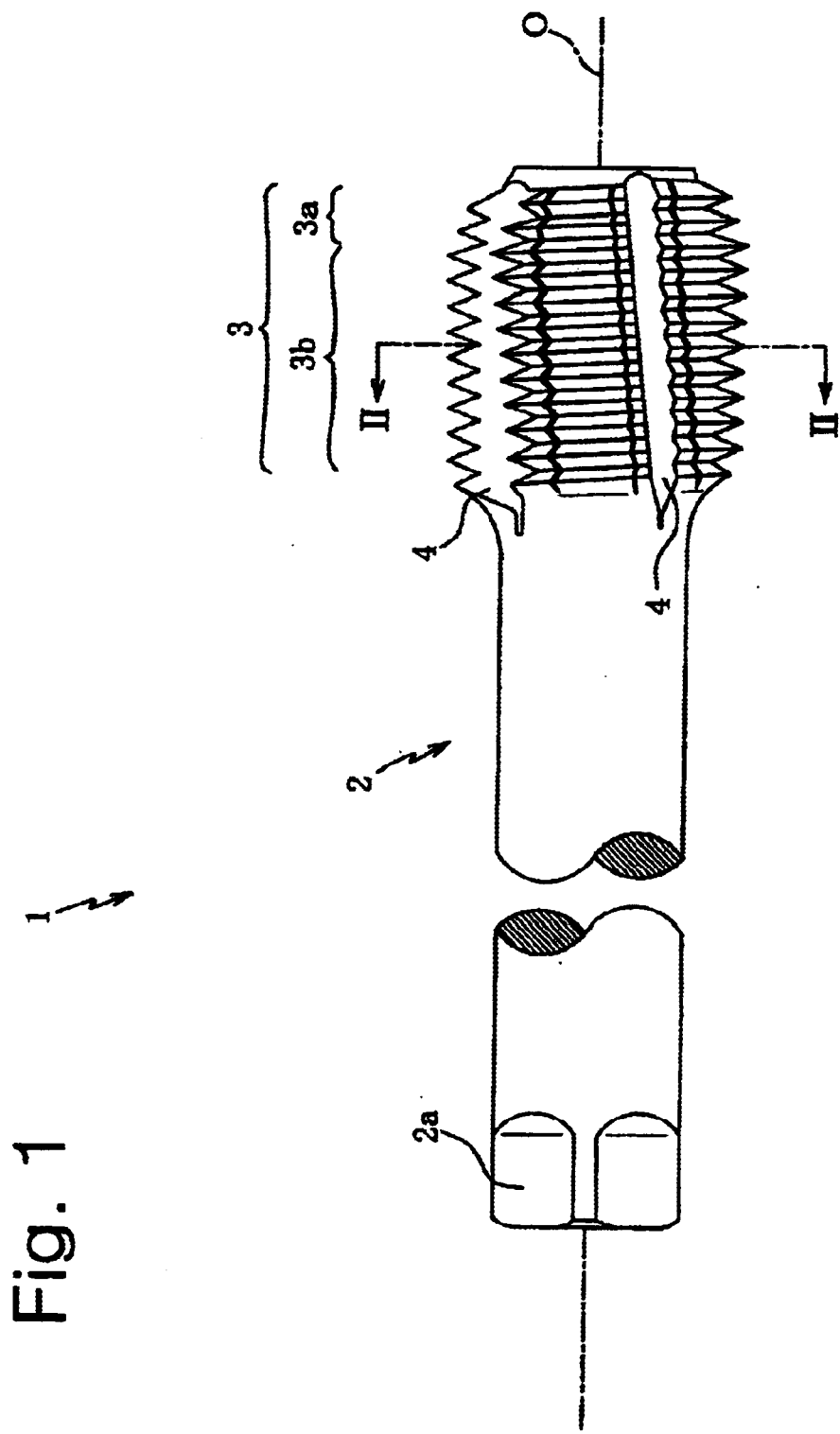
FIG. 1 is a front view of the thread forming tap in the present invention.

The preferred embodiment of the present invention will be explained below with reference to the attached drawings. FIG. 1 is a front view of the thread forming tap in the present invention, which shows a shortened axial length of a shank 2. An overall structure of the thread forming tap 1 will be explained first with reference to FIG. 1.

The thread forming tap 1 of the present invention is mainly comprised of a cylindrical shank 2 and an external thread 3 established at the tip of the shank 2 (right side of FIG. 1). Further, the thread forming tap 1 is used as a tool to form an internal thread in a prepared hole (hole before threading) of a workpiece, which is fulfilled by the torque of a finishing machine transferred through a holder (not shown) supporting the shank, and feeding that matches the lead of the screw thread. The ridges are then raised on the surface of the prepared hole of the workpiece by plastic flow, thereby forming the internal thread. The internal thread forming processing with the thread forming tap 1, however, is not limited to the machine processing such as by a machining center, but can be fulfilled manually.

The cylindrical shank 2 having an axis O is made of high speed tool steel where a shank square portion 2a having a square shape in cross section is established at another end (left side of FIG. 1). The material for the shank 2 is not limited to the high speed tool steel and can be made of cemented carbide as well.

The external thread 3 is established at the tip of the shank 2 (right side of FIG. 1). The external thread 3 is to spirally advance through the prepared hole of the workpiece to form (roll in) the internal thread, and is provided with a chamfer 3a and a full thread part 3b. Oil flutes 4 are established diagonally relative to the axis O on the outer surface of the external thread 3.

The chamfer 3a is to form an internal thread by the plastic flow when biting into an internal surface of the prepared hole of the workpiece, and has a taper shape where an outer diameter gradually decreases in size towards the tip (right side of FIG. 1). The length of the chamfer 3a of the tap in the present invention is two threads, however, it can be any number of threads.

The full thread part 3b, when forming the internal thread through the rolling process mainly, improves the finish of the internal thread as well as guides or acts for self guidance. The full thread part 3b substantially matches the ridges (crests and roots) of the internal thread to be rolled in.

During the internal thread rolling process, the oil flutes 4 promote a lubrication effect, and supply the tapping oil to the rolling surface. Since they are extended in a straight line from the tip to the end of the external thread 3, the oil flutes 4 can be easily created after a thread grinding process of the external thread 3.

Rather than the diagonal direction as shown in FIG. 1, the oil flutes 4 can be established in parallel with the axis O, or in a spiral shape. Further, the oil flutes 4 do not have to be extended from the tip to the end of the external thread 3, and can be established only on a part of the external thread 3. For example, it can be established at the tip of the external thread 3.

Next, the cross section of the external thread 3 on the thread forming tap 1 will be explained with reference to FIG. 2 which shows the cross sectional view taken along the line II—II of FIG. 1. For easier understanding, the diagram corresponds to the external thread 3 is cut along the root of the ridge.

Figure 2:
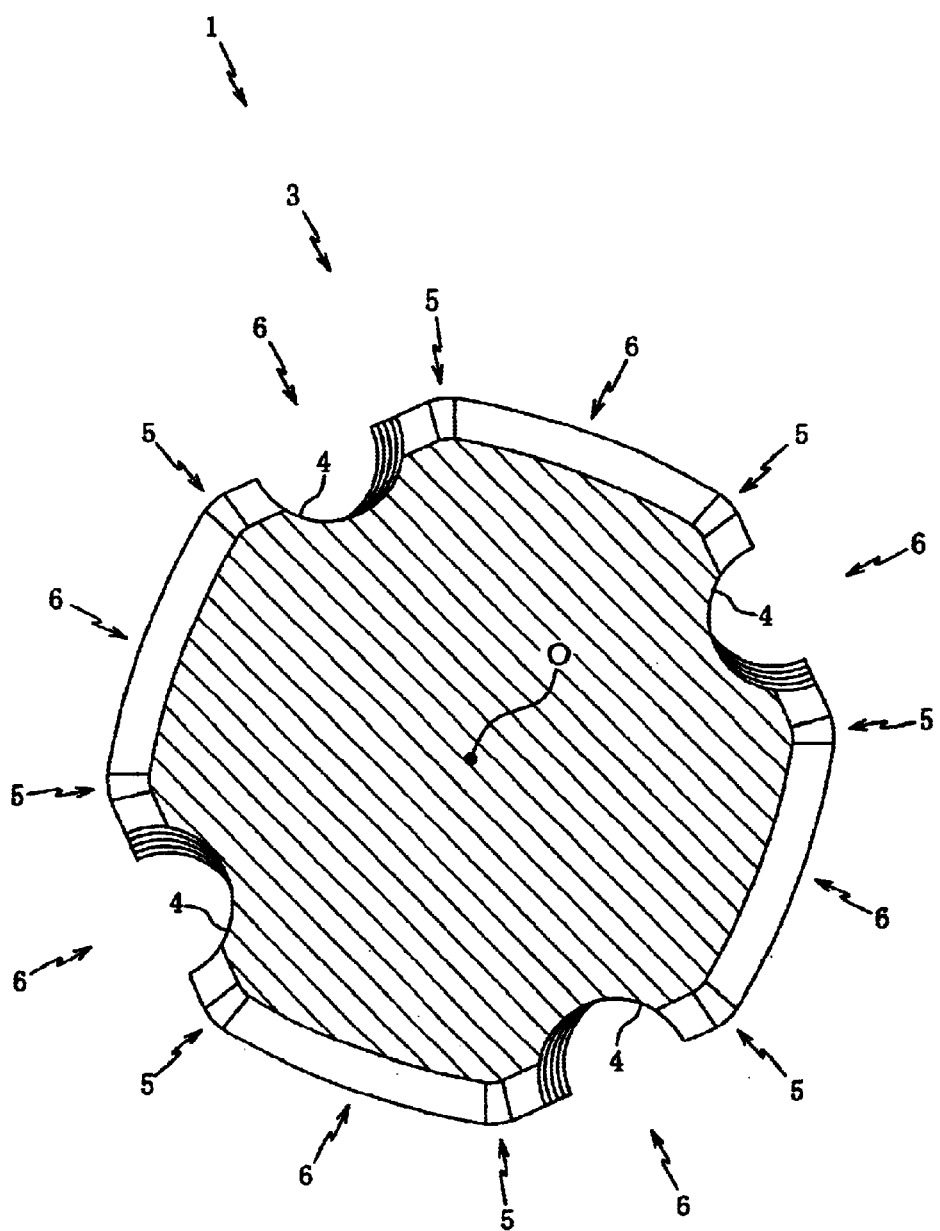
FIG. 2 is a cross sectional view along the II—II line on the thread forming tap of FIG. 1.

In FIG. 2, the external thread 3 has an octagonal cross section formed with eight edges outwardly curved, and the ridge with almost the same height from the outer surface of the cross section (root) is formed along the helix at a predetermined lead angle. In this cross sectional view of FIG. 2, the ridge is formed with eight margins 5 which are radially projecting, and eight reliefs 6 each being established between two adjacent margins 5.

Therefore, the margins 5 and the reliefs 6 established on the ridge of the external thread 3 are formed in the direction of the screw thread, i.e., along the helix, with a predetermined lead angle, and are alternately linked to one another around the axis O. Since the margins 5 are aligned in a predetermined helix angle β (see FIG. 3), as will be explained later, each margin 5 is slightly dislocated from the adjacent margin in a circumferential direction when they are adjoined at every lead (one rotation) of the helix.

Further, the oil flutes 4 noted above are established at four of the eight reliefs 6 which face each other where each oil flute 4 has a semicircular shape in cross section. The cross sectional shape of these oil flutes 4 is not particularly limited to the semicircular shape, and can be structured in a V-shaped cross section or other shape as well. Also, the number of the oil flutes 4 does not always have to be four, but can be less than or greater than four.

Furthermore, the oil flutes 4 do not have to be established on the external thread 3 at all. In particular, a thread forming tap 1 with a small outer diameter, for example, with a nominal designation of up to M2.6, is preferred to be a non-flute type. This is because the tapping torque involved in small taps is also small and the lubricating oil is not required as much. As a result, the grinding process for establishing oil flutes can be eliminated, which will in turn reduce the manufacturing cost for the thread forming tap 1.

Figure 3:
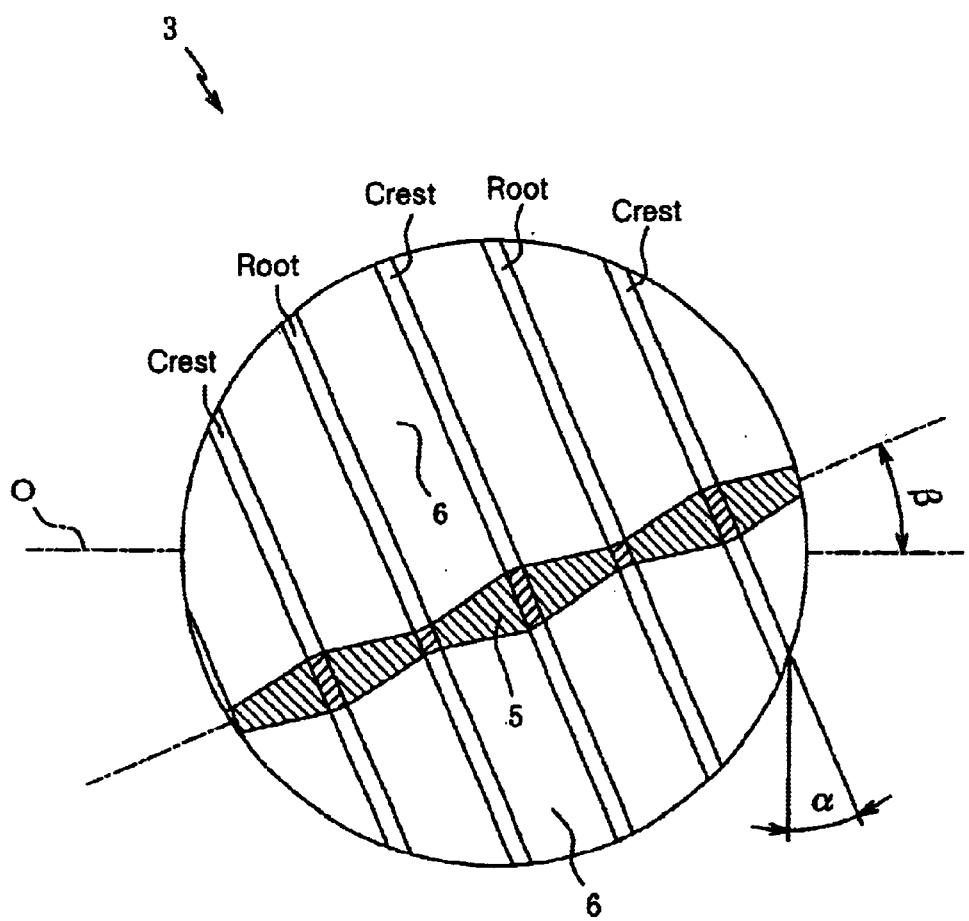
FIG. 3 is an enlarged front view showing a part of the external thread of the thread forming tap in the present invention.

Next, with reference to FIG. 3, the helix twist of the margin 5 will be explained. FIG. 3 is a front view of the thread forming tap 1, and more particularly, it is an enlarged front view of a portion of the external thread 3. For easier understanding, hatching is provided in FIG. 3 to show the margins 5. The right side of FIG. 3 is directed to the tip of the thread forming tap 1 (chamfer 3a of the external thread 3), and the left side is directed to another end the thread forming tap 1 (full thread part 3b of the external thread 3).

The margins 5 are aligned in a helix (spiral) manner in a direction opposite to the helix of the external thread 3. In other words, when the external thread 3 is a right hand screw, the margins 5 are twisted to the left, and when the external thread 3 is a left hand screw, the margins 5 are twisted to the right.

In the embodiment of FIG. 3, since the external thread 3 of the thread forming tap 1 is a right handed screw, the margin 5 has a left handed twist. Therefore, the ridge (crest and root) of the external thread 3, as shown in FIG. 3, is upwardly inclined from the tip to the end of that external thread 3, while the margins 5 are downwardly inclined from the tip to the end of the external thread 3.

As a result, the margins 5 are established at a right angle relative to the lead angle of the ridge on the external thread 3. Thus, in the thread grinding process for producing the thread forming tap 1 where the grinding stone proceeds along the lead of the ridge to grind the external thread 3, no interference by the grinding stone will arise at the margins 5. Consequently, unlike the conventional technology, there is no increase in the apparent width (area) of the margins 5 by the interference.

As a result of preventing the apparent area of the margin 5 from increasing due to the interference with the grinding stone, the rotational resistance during the tapping (tapping torque) can be reduced. As a result, the rolling load applied to the margin 5 can also be reduced, thereby avoiding premature failures in the margins 5 as well as achieving high durability of the thread forming tap.

In the preferred embodiments, when the lead angle of the external thread 3 is α, a helix angle β of the margin 5 is greater than 0° and less than 10° or 4α. By having the helix angle β greater than 0°, the margins 5 will not be parallel with the axis O, thus, the interference with the grinding stone can be suppressed, resulting in the reduction of the tapping torque as well as the increase in the durability.

When the helix angle β is too large, it becomes difficult for the thread forming tap 1 to advance in the axial direction in the prepared hole, which increases the tapping torque. Thus, by having the helix angle β less than 10° or 4α, such a problem can be avoided. As noted above, the helix of the margins 5 is in the direction opposite to the helix on the external thread 3. Due to this, the thread forming tap 1 becomes difficult to be pressed in the axial direction during tapping when the helix angle β of the margin 5 is unnecessarily large. Thus, by specifying the upper limit of the helix angle β of the margin 5 to be less than 10° or 4α, it is possible to solve such a problem.

The range of "less than 10° or 4α" as noted above means that the upper limit of helix angle β is either 10° or 4α, which ever value is larger, and does not mean that it excludes all helix angles greater than 10°. For example, if the nominal designation of the thread forming tap 1 is M5×0.8, the lead angle α is 3°15' where four times (4α) the lead angle is 13°. In this case, the upper limit of the helix angle β is not 10° but rather 13°, i.e, 4α.

In contrast, in the case where a thread forming tap with a large diameter or a thread forming tap for fine pitch threads, the lead angle α is relatively small such as 1°. Due to this, four times (4α) the lead angle a becomes 4°, however, the upper limit of the helix angle β is not 4α or 4° but rather 10°.

The production method of the thread forming tap 1 of the present invention described above will be explained with reference to FIG. 3. First, for the outer surface of the cylindrical material made of the predetermined metal material noted above, a thread grinding process for grinding the ridge of the external thread 3 is conducted. In the thread grinding process, the cylindrical material is rotated around the axis O and axially advanced while being contacted on an outer surface of the grinding stone having the ridges. As a result, the ridges (the margins 5 and reliefs 6 with the helix angle β) of the external thread 3 are formed.

As mentioned above, in the conventional thread forming tap, the margins are parallel with the axis O, thus, it is difficult to control a root width of the margins during the thread grinding process. However, the thread forming tap 1 of the present invention has margins 5 arranged in a perpendicular manner with the lead of the external thread 3, thus, the root width of the margins 5 can be easily controlled during the thread grinding process.

Therefore, by controlling the width (root width) of the margins 5 during the thread grinding process, a thread forming tap 1 is achieved having the width of the margins that match the material of a workpiece. For example, in the thread forming tap for processing relatively soft material such as aluminum, the tapping torque can be reduced by a thread forming tap with small width of the margin 5. In contrast, in the thread forming tap for processing hard material such as stainless steel, the wear can be controlled by making the width of the margin 5 large.

The diameter of the grinding stone is large enough for the diameter of the thread forming tap 1. For example, the diameter of the grinding stone for producing an M10 thread forming tap is approximately 500 mm. Such a difference in the diameter is also a factor that causes the increase in the interference with the grinding stone. However, such a difference in the diameter is unavoidable when the diameter of the tap is small for maintaining the grinding efficiency (production) in the practical use.

After the thread grinding process, a flute grinding process for forming the oil flutes 4 is conducted, thereby completing the production process of the thread forming tap 1. In this process, by applying the flat surface grinding to the external thread 3 diagonally relative to the axis O, the oil flutes 4 with a predetermined depth and number are formed from the tip to the end of the external thread 3, thereby completing the thread forming tap 1.

The result of tapping test conducted on the thread forming tap 1 of the present invention will be described below. In the tapping test, tapping torque and thrust load are measured which arise when rolling the internal thread in the prepared hole of the workpiece.

The detailed data of the tapping test includes: (1) workpiece material: JIS-S45C, (2) diameter of a hole before threading: φ4.6×9 mm (through hole), (3) tapping length: 7.5 mm, (4) tapping speed: 955 rpm (15 m/min), (5) machine used: vertical machining center, and (6) tapping oil: water-soluble cutting oil.

Further, the tapping test is conducted on the thread forming tap 1 in the present invention (hereafter referred to "sample A"), and the conventional thread forming tap with similar form and dimensions except for the margins 5 being parallel to the axis O (hereafter referred to "sample B"). The shape of the sample A and the sample B is: (1) nominal designation: M5×0.8, (2) length of the chamfer 3a: two threads, (3) lead angle α of the thread: 3°15', and (4) helix angle β of the margins 5: 6°30' in the sample A and 0° in the sample B.

Figure 4:
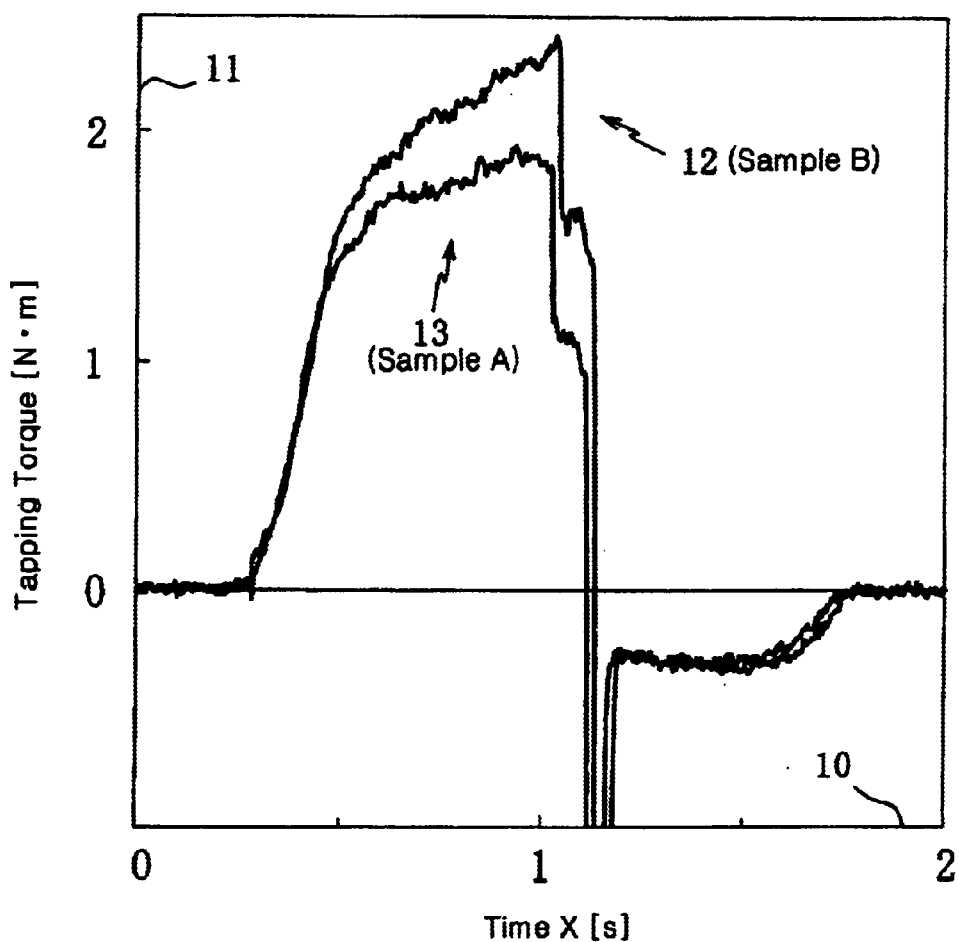
FIG. 4 is a diagram showing the results of the tapping test of the conventional tap and the tap of the present invention.
Figure 6B:
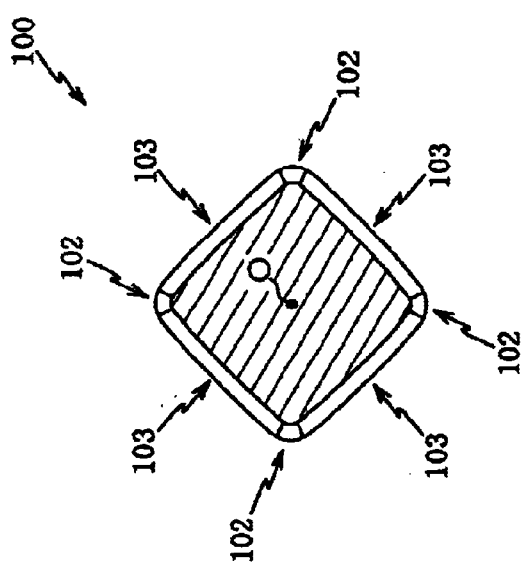
FIGS. 6A and 6B are diagrams showing the conventional thread forming tap, where
Figure 6A:
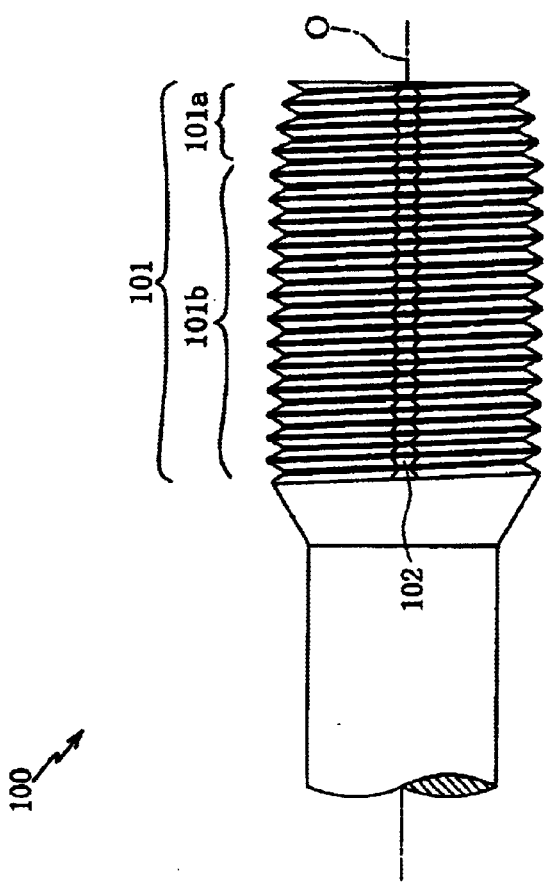
Figure 7:
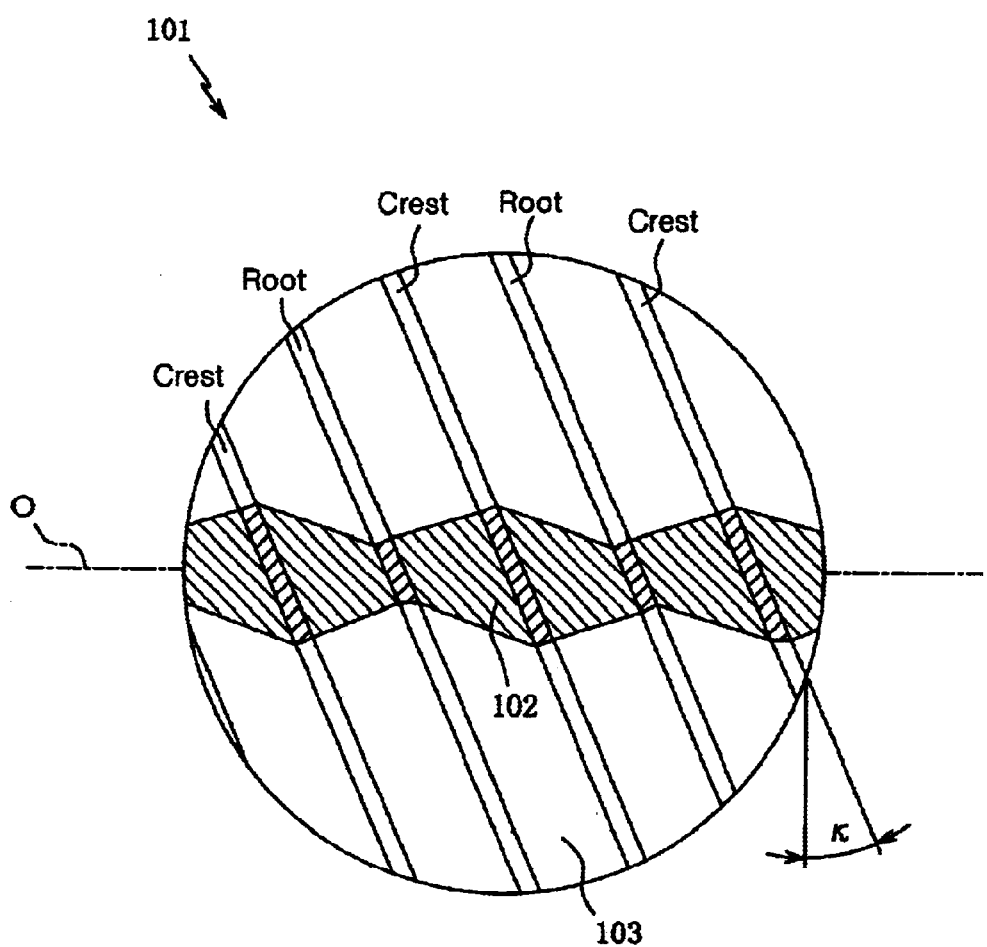
FIG. 7 is an enlarged front view showing a part of the external thread of the conventional thread forming tap.

FIG. 4 shows the result of the tapping test, which compares the time transition of tapping torque Y between the sample A (present invention) and the sample B (conventional example). In FIG. 4, the horizontal axis 10 indicates the time passage X from the start of the tapping test, and the vertical axis 11 indicates the tapping torque Y measured in the tapping test. Further, the measurement value 12 is a graph of the sample B, and the measurement value 13 is a graph of the sample A.

FIG. 5 shows the data comparing the performance, i.e., the tapping torque and the thrust load, between the sample A and the sample B. More specifically, the table of FIG. 5 for performance comparison expresses the performance of the sample A (present invention) using the performance of the sample B (conventional example) as a reference, where the performance of sample B is noted as "1". Therefore, the smaller than "1", the better performance the sample A has.

When comparing the measurement value 12 (sample B) and the measurement value 13 (sample A) in FIG. 4, the tapping torque Y in both graphs have similar slopes, which rise dramatically after the tapping is started. After this rise, the tapping torque Y of the measurement value 12 continues to further increase along the time passage X with a relatively large angle.

In contrast, the tapping torque Y of the measurement value 13 (sample A) maintains a constant value with a smaller absolute value than the measurement value 12 (sample B). As a result, the performance comparison of the tapping torque of the sample A is "0.83" as shown in FIG. 5, which is 23% less than the sample B.

Further, the finished surface of the internal thread formed by the sample A (present invention) where the tapping torque Y is constant shows better precision than the finished surface of the internal thread formed by the sample B (conventional example). The performance of the thrust load in the sample A, as shown in FIG. 5, is substantially the same as that of the sample B.

Next, the result of durability test of the thread forming tap 1 of the present invention will be explained. The durability test counts the number of tapping until the wear generated on the chamfer 3a of the thread forming tap 1 exceeds a predetermined reference value.

The detailed data of the durability test includes: (1) work material: JIS-S25C, (2) diameter of a hole before threading: φ13.2×30 mm (blind hole), (3) tapping length: 30 mm, (4) tapping speed: 220 rpm, (5) machine used: horizontal machining center; (6) feed: rigid, and (7) tapping oil: water-soluble cutting oil.

The shape of the sample A (present invention) is: (1) nominal designation: M14×1.5, (2) length of the chamfer 3a: two threads, (3) lead angle α of the thread: 2°05', (4) helix angle β of the margins 5: 4°10' in the sample A and 0° in the sample B.

In the durability test, upon confirming the result of wear on the chamfer 3a of the sample A (present invention) and the sample B (conventional example) when the number of tapping reaches 5,000, the amount of wear is less than the reference value in both the samples A and B. Further, when the number of tapping reaches 10,000, the wear greater than the reference value is observed in the sample B where a portion of the chamfer 3a shows failure.

In contrast, even when the number of tapping reaches 15,000, the sample A continues to wear in a normal manner without fail, where the degree of the wear is still less than the reference value. Then, when the number of tapping reaches 18,000, the wear greater than the reference value is observed on the sample A.

The tapping test as well as the durability test are also conducted under the conditions other than the helix angle β for the sample A (present invention) noted above (β=2α). As a result, the condition noted above (β=2α) showed the best performance in the tapping torque and durability than other angles.

Further, as for the upper limit value of the helix angle β, in the tapping test, the helix angle β is set to four times of the lead angle α (β=4α=13°), and in the durability test, the helix angle β is set to 10° (β=10°>4α). In this case, although the tapping torque and durability is lower than the case of β=2α, still better performance than that of the sample B (conventional example) is observed. Therefore, considering the production variation, it is preferable that the upper limit value of the helix angle β is less than 10° or 4α.

Although only a preferred embodiment is specifically illustrated and described herein, it will be appreciated that many modifications and variations of the present invention are possible in light of the above teachings and within the purview of the appended claims without departing the spirit and intended scope of the invention.

For example, the cross sectional shape of the thread forming tap 1 is described as having an octagonal shape, however, it can also have a triangular shape or other polygonal shapes. In such a case, the margins 5 do not have to be formed on all radially projected portions, but can be established axially in either one or two rows for any polygonal shape.

Further, the surface of the thread forming tap 1 can be applied with surface hardening treatment by nitriding, or surface coating treatment by Tin or TiCN coating. The range of such treatment can be on the entire external thread 3 or just a portion of the external thread 3.

According to the thread forming tap 1 in the first aspect of the present invention, the margin of the external thread is twisted in the direction opposite to the helix on the external thread. In other words, the margins of the external thread twist to the left when the external thread is a right handed screw, and twist to the right when the external thread is a left handed screw. Due to this, each margin adjoined in the axial direction of the external thread is perpendicular to the lead angle of the ridge of the external thread, thus, the interference at the margins caused by the grinding stone during the thread grinding process can be prevented.

Therefore, unlike the conventional thread forming tap, the rotational resistance during the tapping, i.e., the tapping torque can be reduced. As a result, the load applied to the margins is reduced, thereby achieving a thread forming tap with high durability.

In addition to the effect in the first aspect of the present invention, according to the thread forming tap in the second aspect of the present invention, the helix angle β of the margin on the external thread is greater than 0° and less than 10° or 4α (whichever larger) when the lead angle is α. Therefore, the margins of the external thread have a helix angle larger than 0°. In other words, since the margins will not become parallel to the axis of the external thread, the interference with the grinding stone can be prevented, which in turn reduces the tapping torque and improves the durability.

The helix of the margins is in the opposite direction of the helix on the external thread. Thus, when the helix angle of the margins becomes too large, the thread forming tap becomes difficult to be pressed toward the axial direction during the tapping, resulting in an increase in tapping torque. However, in the present invention, the margins of the external thread have a helix angle less than 10° or 4α, hence, the helix angle will not become larger than necessary, thereby alleviating the difficulty in pressing the thread forming tap in the axial direction. This in turn suppresses the increase in the tapping torque as well as improves the durability.

According to the thread forming tap in the third and fourth aspects of the present invention, in addition to the effects noted above, the oil flutes established in the external thread are either parallel or diagonal to the axis and extended in a straight line. This allows the oil flutes to be formed easily and quickly.

Further, when these oil flutes have a helix angle β, i.e., twisted in the same direction as the margins adjoined axially, the oil flutes can easily be processed on the reliefs even if the width of the reliefs is small and the space to form the oil flutes is small.

What is claimed is:

1. A thread forming tap for forming an internal thread by plastic deformation, comprising:

an external thread in a screw shape with alternately linked margins and reliefs; and an oil flute established on the external thread;

wherein the external thread has a lead angle α and the margins of the external thread have a helix angle β inclined in a direction opposite to a direction of the helix of the external thread relative to an axis of the tap, and the helix angle β of the margins is larger than 0° and smaller than 10° or 4α; and wherein the oil flute is inclined relative to the axis of the tap where an angle and direction of the oil flute are identical to that of the margins on the external thread.

2. A thread forming tap as defined in claim 1, wherein an outer diameter of said thread forming tap is greater than a nominal designation of M2.6.

3. A thread forming tap as defined in claim 2, wherein an outer diameter of said thread forming tap is greater than a nominal designation of M6 and a cross sectional shape is a polygon of pentagon or greater.

4. A thread forming tap as defined in claim 3, wherein the cross sectional shape of the thread forming tap is an even number polygon of hexagon or greater, and an even number of oil flutes are formed on at least two reliefs facing with one another.

5. A thread forming tap as defined in claim 4, wherein the cross sectional shape of the thread forming tap is an octagon, and four oil flutes are formed on the reliefs facing with one another.

6. A thread forming tap as defined in claim 5, wherein the relief having the oil flute and the relief without having the oil flute are alternately linked to one another on the external thread.

7. A thread forming tap as defined in claim 6, wherein the oil flute is extended throughout the external thread including a chamfer and a full thread part thereof.

8. A thread forming tap as defined in claim 1, wherein a surface hardening treatment using nitride is applied to a surface of the thread forming tap.

9. A thread forming tap as defined in claim 1, wherein a surface hardening treatment by Tin or TiCN coating is applied to a surface of the thread forming tap.

* * * * *